United States Patent Office 2,905,588
Patented Sept. 22, 1959

2,905,588

GROWING AND PROTECTION OF CROPS AND COMPOSITIONS THEREFOR CONTAINING AN ETHYNYL KETONE

Charles R. Youngson, Long Beach, Calif., assignor to The Dow Chemical Company, Midland, Mich., a corporation of Delaware No Drawing. Application April 26, 1957
Serial No. 655,172

8 Claims. (Cl. 167—39)

The present invention relates to the culture and protection of crops and is particularly concerned with a new method and composition for the control of soil dwelling invertebrates which attack plant roots and for the improvement of the emergence, seedling growth and harvest of crop plants.

It is an object of the present invention to provide a new agronomical practice for improving the plant growing properties of soil and the ability of soil to support plant growth. An additional object is the provision of a new agronomic practice for improving the growth characteristics of plants and stimulating the growth of crops. A further object is the provision of a new and improved method for the fumigation and disinfection of soil infested with root attacking invertebrate organisms such as nematodes and fungi. Another object is the provision of a novel composition to be employed in the new agronomical practice and method of treating soil. Other objects will become apparent from the following specifications and claims.

The new agronomical practice comprises fumigating or treating soil or growth media with an ethynyl ketone to benefit plants grown in the treated soil. Such practice improves the plant growing properties of soil, protects plants from the ravages of soil dwelling invertebrates which attack their roots and improves the crop harvest as well as the emergence and growth of seeds.

The ethynyl ketones are Grignard reaction products resulting from the reaction of an ethynyl magnesium halide and an acid anhydride, and may be characterized by the following formula $$R—C{\equiv}CH$$

wherein R represents an acyl radical. These ketone compounds are mobile liquids or solids somewhat soluble in many organic solvents and water and are adapted readily and conveniently to be distributed in soil or growth media. Such distribution or impregnation of the soil has been found to accomplish a rapid control of root attacking nematodes and fungi, and to stimulate the growth and improve the growth characteristics of plants. Thus, for example, plants raised in the treated soil have more luxuriant tops and roots and are of a greater total weight than those normally obtained from untreated soil. It is among the advantages of the present invention that the compounds permeate growth media for a short distance from the point of application depending upon the temperature, moisture content, compactness and physical consistency of the medium. It is a further advantage that the compounds are sufficiently persistent to accomplish the desired effect upon soil dwelling fungi and nematodes in a reasonable period of time.

The distribution in soil or growth media of a dosage of the ethynyl ketones effective to improve the plant growing properties of the soil is essential for the practice of the present invention. For the control of nematodes and fungi, good results are obtained when a parasiticidal concentration of the compounds is distributed in the growth media. In general, good results are obtained when the compounds are distributed through the growth media in the amount of from about 2 to 150 parts or more by weight per million parts by weight of the medium. In field applications, the ketone compounds may be distributed in the soil at a dosage of from 0.1 to 150 pounds or more per acre and through such a cross section of the soil as to provide for the presence therein of an effective concentration of the treating agent. In general field applications, it is usually preferred that the compounds be distributed to a depth of at least 2 inches below the soil surface and at a dosage of at least 0.7 pound per acre inch of soil. Oftentimes it is desirable to distribute the compounds to a depth of 24 or more inches to avoid reinfestation of the soil from deep dwelling fungi or nematodes. In other applications, it may be preferred that the ethynyl ketones be distributed through that cross section of the soil in which the roots of the plants are or will be found. When the treatment is carried out by injection or drilling techniques to a depth of from 4 to 6 inches below the soil surface, it is preferred that the maximum distance between deposits be not materially in excess of about 12 inches. In applications to the furrow seed row for the suppression of seedling disease, it is desirable that the compounds be distributed upon the surfaces of the furrow at a dosage of at least 0.15 pound per acre of furrow soil surface. After such treatment, the furrow is seeded and the soil compacted about the seed according to conventional practice.

In one embodiment of the invention, the treated soil is planted with the desired crop plant following the distribution of the ethynyl ketones in the soil. Where minimum dosages of the toxicants are distributed in soil, the treated soil may be immediately planted with the desired crop. Following the distribution of larger dosages of the toxicants it is desirable that any planting operation not be carried out for a period of from several hours to several days, the exact period depending upon the concentration of the toxicants in the soil and the resistance of the species concerned to the toxicants. When the toxicants are employed for the treatment of the soil adjacent to the root system of established plants having a resistance to the ethynyl ketones and in side dressing operations, the existing vegetation is not unfavorably affected by minimum effective concentrations of the ethynyl ketones temporarily present in the soil.

The method of the present invention may be carried out by distributing the unmodified ethynyl ketones through the growth media as by impregnation. However, the present method also embraces the employment of a liquid or dust composition containing the toxicants. In such usage, the toxicants may be modified with one or a plurality of additaments or soil treating or parasiticide adjuvants, including water or other liquid carriers, surface-active dispersing agents and finally divided inert solids. Depending upon the concentration of toxicant, such augmented compositions are adapted to be distributed in the soil, or employed as concentrates and subsequently diluted with additional inert carrier to produce the ultimate treating compositions. The required amount of the ethynyl ketones in the growth media conveniently may be supplied per acre treated in from 5 to 27,000 gallons or more of the aqueous carrier, in from 1 to 50 gallons of organic solvent carrier or in from about 20 to 2,000 pounds of the solid carrier.

The exact concentration of the ethynyl ketones to be employed in compositions for the treatment of growth media may vary provided the required dosage of effective agent is supplied in the soil. The concentration of toxicant in organic solvent compositions employed to supply the desired dosage generally is from about 10 to 85 percent by weight. With aqueous compositions, the required dosage is generally supplied with compositions containing from 0.1 to 50 percent by weight although concentrations of 0.0001 percent by weight conveniently may be employed in irrigation treatments of soil. In dusts, the concentration of toxicant may be from about 1 to 50 percent by weight, although concentrations as low as 0.1 percent by weight are sometimes employed. In compositions to be employed as concentrates, the toxicants oftentimes are present in a concentration of from about 5 to 95 percent by weight.

Liquid compositions containing the desired amount of the ethynyl ketones may be prepared by dissolving the toxicant in an organic liquid such as acetone, toluene, methylene chloride, chlorobenzene and petroleum distillates or by dispersing the toxicant in water with or without the aid of a suitable surface active dispersing agent such as an ionic or non-ionic dispersing and emulsifying agent. The preferred organic solvent carriers are those which are adapted to accomplish the penetration and impregnation of the soil with the toxicant and are of such volatility they evaporate from the soil and leave little permanent residue therein.

The aqueous compositions may contain one or more water-immiscible solvents for the ethynyl ketones. In such compositions, the carrier comprises an aqueous emulsion, i.e. a mixture of water-immiscible solvent, emulsifying agent and water. The choice of dispersing and emulsifying agent and the amount thereof employed is dictated by the nature of the composition type and by the ability of the agent to facilitate the dispersion of the toxicant in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. In such compositions, the surface active agents are usually employed in the amount of from 1 to 20 percent by weight of the combined weight of the surface active agent and the ketone compound.

A preferred embodiment of the invention consists of a petroleum distillate solution of ethynyl ketones. The petroleum distillates to be employed in such embodiment are carefully cut portions boiling almost entirely under 400° F. at atmospheric pressure, having a flash point above about 80° F. and leaving very small residues on evaporation. These compositions are characterized by having excellent penetrating properties and by being of low fire hazard to the shipper and user.

In the preparation of dust compositions, the ethynyl ketones are dispersed in and on a finely divided inert solid such as talc, chalk, gypsum and the like. In such operations, the carrier is mechanically ground with the compounds or wet with a volatile organic solvent solution thereof. Similarly, dust compositions containing the compounds may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be employed for the treatment of soil. Also such concentrate dust compositions may be dispersed in water with or without the aid of a dispersing agent to form aqueous solid-treating compositions.

A further preferred embodiment of the present invention is a novel composition comprising soil in admixture with an effective concentration of ethynyl ketones.

When operating in accordance with the present invention, the soil may be impregnated with ethynyl ketones, or a composition containing the toxicants, in any convenient fashion, e.g. by simple mixing with the soil, by employing a liquid carrier to accomplish the penetration and impregnation, or by injection or drilling techniques whereby the toxicant is deposited beneath the surface of the soil. In general, it is desirable that the distribution be carried out at a soil temperature of 45° F. or higher since the effectiveness of the toxicants may be somewhat reduced at lower temperatures.

In a preferred embodiment, the method of the present invention is carried out in soil having a moisture content of from about 50 to 100 percent of the moisture equivalent of the soil. When operating under such soil conditions, maximum improvements in crop yields and conditions, and controls of nematodes are obtained. Thompson, L. M., in "Soils and Soil Fertility," McGraw Book Co., Inc. (1952), defines the moisture equivalent of a soil as equal to the percentage of water retained by wet soil after being centrifuged at 1000 times gravity. This equivalent is about the same as the so called field capacity which may be defined as the moisture condition of the soil when downward movement of water into the soil has virtually ceased. This moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In such procedure, the amount of water may be varied in accordance with the moisture content and the moisture equivalent or field capacity of the soil in order to obtain the desired depth of distribution of the toxicant at a soil moisture content equal to the moisture equivalent. In such method, the toxicant readily and conveniently may be distributed to a depth of from two to four feet or more to avoid reinfestation from deep dwelling organisms.

The expressions "growth media" or "soil" are employed in the present specification and claims in their broadest sense to be inclusive of all conventional "soils," as defined in Websters New International Dictionary, Second Edition, Unabridged, published in 1937 by G. and C. Merriam Company, Springfield, Massachusetts. Thus, the terms refer to any solid substances or media in which vegetation may take root and grow, and are intended to include not only earth but compost, manure, muck, humus, and sand and the like adapted to support plant growth.

The following examples illustrate the invention but are not to be construed as limiting the same.

*Example 1*

1-butyn-3-one was dissolved in water to prepare aqueous compositions containing 0.17, 0.86 and 4.3 pounds of the toxicant compound per 5 gallons of ultimate mixture. These compositions were employed for the treatment of seed beds containing a sandy loam soil heavily infested with the fungus organisms *Fusarium solani*, *Pythium spp.*, and *Rhizoctonia solani*. At the time of treatment, the soil in the beds had a moisture content equal to about 75 percent of the moisture equivalent of the soil. Prior to treatment, the soil had been furrowed at 4 inch intervals for seeding with lima beans. In the treating operations, the bottoms and sides of the furrows were sprayed with the toxicant compositions at a dosage of 5 gallons of aqueous composition per acre of furrow soil surface and the soil spread over and about the seeds according to conventional planting practices. In a check operation, seed beds of the same infested but untreated soil were similarly planted with lima beans. During the subsequent growing period there was observed no adverse effect upon the germination and growth of seedlings attributable to the 1-butyn-3-one compound.

Four weeks after seeding, the seed beds were inspected to determine the percentage emergence of seedlings and the plants lifted from the soil, the roots washed and thereafter examined in order to determine the percent of disease free seedlings. The results are set forth in the following table.

| Dosage of 1-butyn-3-one compound in pounds per acre of furrow soil surface | Percent seedling emergence | Percent disease-free seedlings |
|---|---|---|
| 0.17 | 67 | 61 |
| 0.86 | 74 | 71 |
| 4.3 | 93 | 87 |
| Check | 1 | 0 |

*Example 2*

Acetone solutions containing 12.5 grams and 2.5 grams of 1-butyn-3-one were employed for the treatment of a sandy loam soil heavily infested with the organisms *Fusarium solani*, Pythium spp. and *Rhizoctonia solani*. At the time of treatment the soil had a moisture content of 7 percent, the latter being about 50 percent of the field capacity of the soil. In the treating operations, the soil was placed in sealable containers and separately injected with the acetone compositions in amounts sufficient to supply, respectively, 25 and 5 parts by weight of the 1-butyn-3-one compound per million parts by weight of soil. Following the treatment, the containers were sealed and the soil therein mechanically mixed to insure uniform distribution of the toxicant compositions. After mixing, the containers of treated soil were incubated at an average temperature of 25° C. In a check operation, sealed containers containing the same infested but untreated soil were exposed to identical conditions as the treated soil.

After three days, the containers were opened and portions of the treated and untreated soil cultured by the dilution plate method as described by J. P. Martin in "Soil Science," 69, No. 3, pp. 215–32 (March 1950) to determine the percent control of fungal organisms. In the latter operations, the culturing medium employed was a peptone dextrose agar (1000 milliliters of water, 10 grams of dextrose, 5 grams of peptone, 1 grams of $KH_2PO_4$, 0.5 gram of $MgSO_4 \cdot 7H_2O$ and 20 grams of agar) containing 0.069 gram of rose bengal and 0.030 gram of streptomycin per liter of ultimate mixture. In the plating operations, the culturing medium was incorporated with about 0.5 gram of soil sample per liter of medium and the plates thereafter poured in replicates of three for the treated and check soils. The poured plates were then incubated for three days at 25° C.

After incubation, the plates were examined and counts of fungal colonies made in order to determine the percent control of the fungal organisms. The results are set forth in the following table.

| Concentration of 1-butyn-3-one in soil in parts by weight per million parts by weight of soil | Percent control of fungal organisms |
|---|---|
| 25 | 100 |
| 5 | 100 |

*Example 3*

In a further operation, the acetone solution containing 15 grams of 1-butyn-3-one was employed for the treatment of the fungal infested soil of Example 2. In the treating operations, the soil was placed in sealable jars and thereafter injected with the acetone solution in an amount sufficient to supply 25 parts by weight of 1-butyn-3-one per million parts by weight of soil. Immediately after treatment, the soil in the jars was seeded to cotton, the jars thereafter sealed and the seeded soil therein mechanically mixed to insure uniform distribution of the toxicant composition. In a check operation, the same infested but untreated soil was placed in jars, the soil seeded with cotton seeds and the jars thereafter sealed. Three days after seeding, the jars were opened, sufficient water added to each jar to encourage seedling growth and the jars immediately sealed. During the subsequent period of growth, there was observed no adverse effect upon the germination and growth of seedlings attributable to the 1-butyn-3-one compound.

Ten days after seeding, the jars were opened, the seedlings removed and the roots examined in order to determine the number of disease free plants. As a result of examination, it was found that the seedlings from the soil which had been treated with the 1-butyn-3-one compound were free of fungal disease. In the check soils all of the cotton seedlings were found to be heavily infested with the complex of root-rot fungi.

*Example 4*

An aqueous composition containing 1.7 pounds of 1-butyn-3-one was employed for the treatment of seed beds of sandy loam soil heavily infested with the fungus organisms *Fusarium solani*, Pythium spp. and *Rhizoctonia solani*. At the time of treatment the soil in the seed beds had a moisture content equal to about 75 percent of the field capacity. Prior to treatment, the seed beds had been furrowed at four inch intervals for planting with cotton seeds. In the treating operations, the bottoms and sides of the furrows were sprayed with the aqueous composition at the dosage of 5 gallons of composition per acre of furrow soil surface. Immediately following the treatment, cotton seeds were planted in the furrows and the soil compacted about the seeds according to conventional planting practices. In a check operation, similarly infested but untreated seed beds were also planted with cotton seeds. During the subsequent growth period, there was observed no adverse effect upon germination and growth of seedlings attributable to the 1-butyn-3-one compound.

At regular intervals the seed beds were examined to determine the percentage emergence of cotton seedlings and the percent of seedlings which died following emergence. From the observations there was found an emergence of 89 percent of cotton seedlings in the treated soil and a survival of 82 percent of the emerged seedlings. In the check beds there was found an emergence of 70 percent with a survival of 52 percent of the emerged seedlings.

*Example 5*

An acetone solution containing 50 grams of 1-butyn-3-one per liter of solution was employed for the treatment of a sandy loam soil which was infested with root knot nematodes. In such operations the soil was placed in sealable containers and thereafter treated with the composition at a dosage of 50 pounds per acre foot of soil. At the time of treatment, the soil had a moisture content of about 9 percent, the later being about 60 percent of the field capacity. In the treating operations, the distribution was accomplished by injection to give a concentration of about 12 parts by weight of the 1-butyn-2-one compound per million parts by weight of soil. The containers of treated soil were then sealed and set aside for about one week.

Following the latter period, the containers were unsealed, and the treated soil allowed to aerate for about one week and thereafter planted with tomato seeds. Untreated check plots of the same soil were also planted with tomato seeds. During the subsequent growing period there was observed no adverse effect upon the germination and growth of seedlings attributable to the presence of residual toxicant. About eight weeks after planting, the plants were lifted from the soil and the roots washed and examined for evidence of nematode attack. The examination of the plants indicated a 98 percent control of nematodes had been obtained in the treated soil with a medium infestation in the check plots.

*Example 6*

Fifty parts by weight of 1-butyn-3-one, 45 parts of a dimeric alkylated aryl polyether alcohol (Triton X-155) are mixed together to prepare a concentrate composition in the form of an emulsifiable liquid.

Also, 90 parts by weight of 1-butyn-3-one and 10 parts of a sorbitan monolaurate polyoxyethylene derivative (Tween 20) are mechanically mixed together to prepare a water dispersible concentrate composition.

These compositions are adapted to be dispersed in water to produce aqueous compositions having very desirable wetting and penetrating properties. The latter compositions are adapted to be employed to treat soil and distribute 1-butyn-3-one therein in effective concentrations.

*Example 7*

In a determination as described in Example 5, sandy loam soil heavily infested with root knot nematodes is treated with acetone solutions containing 10 and 5 grams of 1-butyn-3-one per liter of ultimate composition and at dosages, respectively, of 20 and 10 pounds of the toxicant compound per acre foot of soil. These dosages correspond, respectively, to concentrations of 5.0 and 2.5 parts by weight of 1-butyn-3-one per million parts by weight of soil. In the treating operations, the soil is placed in sealable containers, the compositions injected into the soil and the containers of treated soil thereafter sealed. At the time of treatment the soil has a moisture content of about 7 percent, the latter being about 50 percent of the moisture eqivalent of the soil. After one week the containers of treated soil are unsealed and the treated soil allowed to aerate for about one week and thereafter planted with tomato seeds. Untreated check plots of the same soil are also planted with tomato seeds. During the subsequent growing period there is observed no adverse effect upon the germination and growth of seedlings attributable to the presence of residual toxicant. Eight weeks after planting, the plants are lifted from the soil and the roots washed and examined for evidence of nematode attack. The examination of the plants indicates that a commercial control of nematodes has been obtained in the soil treated with the 1-butyn-3-one compound. At the time of observation, the plants in the check plots are found to be dwarfed and their roots covered with galls attributable to nematode attack.

*Example 8*

The water-dispersible concentrate composition of Example 6 is dispersed in water to prepare a composition containing about 100 pounds of 1-butyn-3-one per 200 gallons ultimate mixture. The latter composition, while under agitation is metered into irrigation water at the pump outlet at the rate of 2 gallons per 1000 gallons of irrigation water. The water is in a state of turbulent flow as it comes from the pump which provides for the thorough mixing of the toxicant therein. About 3 acre inches of irrigation water is applied to land heavily infested with *Fusarium solani*, *Pythium* spp. and *Rhizoctonia solani* to accomplish a wetting of the soil to a depth of about 18 inches. Two weeks after the treatment, the soil is planted with lima beans. In a check operation, adjacent but similarly infested soil is also planted to lima beans. Seven weeks after seeding, the plots are inspected and representative plants lifted from the soil and their roots examined for evidence of root-rot disease. The examination indicates a commercial control of the complex of root-rot fungi in the treated soil with heavy infestation in the check plots.

*Example 9*

1-butyn-3-one is dissolved in a low boiling petroleum hydrocarbon fraction (Stoddard's solvent) to produce a composition having a flash point greater than 100° F. and containing about 35 percent by weight of the toxicant compound. The hydrocarbon solvent has a boiling range of from about 312° to 390° F. and a flash point of about 116° F. This composition is employed for the treatment of a soil of good nutrient content heavily infested with root-knot nematodes. At the time of treatment, the soil contains about 14 percent by weight of water, the latter being about 80 percent of the field capacity. In the treating operations, the toxicant composition is injected into the soil in rows 12 inches apart, the injections being made at 4 inch intervals and at a depth of about 6 inches below the soil surface. The amount of composition employed is sufficient to supply 30 pounds 1-butyn-3-one per acre. The latter dosage corresponds to a concentration of about 6.8 parts by weight of 1-butyn-3-one per million parts by weight of soil. Following the distribution the average soil temperature remains at about 62° F. for the period of the determination.

Seven days after treatment, the soil is seeded with tomatoes, the seeded soil being that positioned about 6 inches from the loci of treatment. Untreated check plots are also planted with tomato seeds. During the subsequent growing period there is observed no adverse effect upon the germination and growth of seedlings attributable to the presence of residual toxicant. Five weeks after seeding, the plants are lifted from the soil and the roots examined for gall formation attributable to nematode attack. The examination indicates a commercial control of nematodes in the treated soil with heavy infestation in the check plots.

*Example 10*

An acetone solution containing 10 grams of 1-pentyn-3-one per 100 milliliters of solution was dispersed in water to prepare an aqueous composition containing 160 parts by weight of 1-pentyn-3-one per million parts of aqueous composition. This composition was employed for the treatment of areas of sandy loam soil of good nutrient content heavily infested with root-knot nematodes. In the treating operations, the composition was applied to the soil as a drench and at a rate of 5.9 acre inches of aqueous composition per acre to supply about 26 parts by weight of 1-pentyn-3-one per million parts by weight of soil. Seven days after treatment, three inch sections of soil were taken from the treated areas at various depths below the soil surface, the sections placed in seed beds and the beds thereafter planted with cucumber seeds. In an exactly analogous fashion, sections of soil were taken from areas of similarly infested but untreated soil, and the sections placed in seed beds and planted with cucumber seeds to serve as checks.

Seven weeks after seeding the plants were lifted from the soil, their roots washed and the latter examined for galls attributable to root-knot nematode disease. The depths below the soil surface at which the soil sections were procured and the percent control of nematodes obtained in the sections are set forth in the following table.

| Depths below soil surface in inches at which the sections of soil were obtained | Percent control of root-knot nematodes |
| --- | --- |
| 1-3 | 100 |
| 3-6 | 100 |
| 9-12 | 100 |

At the time of the observations, the check plants were found to be stunted and their roots covered with galls attributable to root-knot nematodes.

*Example 11*

An acetone solution containing 10 grams of 1-hexyn-3-one per 100 milliliters of solution was dispersed in water to prepare an aqueous composition containing 160 parts by weight of 1-hexyn-3-one per million parts by weight of ultimate composition. This composition was employed exactly as described in the preceding example for the treatment of soil of good nutrient content which was heavily infested with root-knot nematodes. The treating and planting operations were all as previously described with the composition being applied to the soil areas as a soil drench in an amount sufficient to supply 26 parts by weight of the 1-hexyn-3-one compound per million parts by weight of soil. The results obtained in these operations are set forth in the following table.

| Depths below soil surface in inches at which the sections of soil were obtained | Percent control of root-knot nematodes |
| --- | --- |
| 1-3 | 100 |
| 3-6 | 100 |
| 9-12 | 100 |
| 15-18 | 100 |

At the time of the observations, the roots of the check plants were found to be covered with galls attributable to root-knot nematode disease.

*Example 12*

Acetone solutions containing 12.5, 5.0 and 2.5 grams of 1-hexyn-3-one per 100 milliliters of solution were employed for the treatment of sandy loam soil heavily infested with the organisms *Fusarium solani,* Pythium spp., and *Rhizoctonia solani.* At the time of treatment, the soil had a moisture content of about 7 percent, the latter being 50 percent of the field capacity of the soil. In the treating operations, the soil was placed in sealable containers and separately injected with the acetone compositions in amounts sufficient to supply, respectively, 25, 10 and 5 parts by weight of 1-hexyn-3-one per million parts by weight of soil. Following the treatment, the containers were sealed and the soil therein mechanically mixed to insure uniform distribution of the toxicant compositions. After mixing, the containers of treated soil were incubated at an average temperature of 25° C. In a check operation, sealed containers containing the same infested but untreated soil were exposed to identical conditions as the treated soil. After three days, the containers were opened and portions of the treated and untreated soil cultured as described in Example 2 to determine the percent control of fungus organisms. The results obtained in this operation are set forth in the following table.

| Concentration of 1-hexyn-3-one in parts by weight per million parts by weight of soil | Control of fungus organisms |
| --- | --- |
| 25 | 100 |
| 10 | 93 |
| 5 | 93 |

At the time of the observations, the check soil was found to contain a heavy infestation of the complex of root-rot fungi.

*Example 13*

Acetone solutions containing 12.5 grams and 2.5 grams of propiolophenone per 100 milliliters of solution and 12.5 grams of 1-pentyn-3-one per 100 milliliters of solution were employed as described in the preceding example for the treatment of sandy loam soil heavily infested with the organisms *Fusarium solani,* Pythium spp., and *Rhizoctonia solani.* The treating and culturing methods employed were all as previously described. The results obtained in such operations are set forth in the following table.

| Test compound | Concentration of test compound in soil in parts by weight per million parts by weight of soil | Percent control of fungus organisms |
| --- | --- | --- |
| Propiolophenone | 25 | 100 |
| 1-pentyn-3-one | 10 | 75 |
| | 25 | 100 |

At the time of the observations, the untreated check soil was found to contain a heavy infestation of the complex of root rot fungi.

*Example 14*

An acetone solution containing 10 grams of propiolophenone per 100 milliliters of solution was dispersed in water to prepare an aqueous composition containing 160 parts by weight of propiolophenone per million parts by weight of aqueous composition. This composition was employed as described in Example 10 for the treatment of sandy loam soil of good nutrient content heavily infested with root-knot nematodes. The treating and planting operations were all as previously described with the composition being applied to the soil as an aqueous drench in an amount sufficient to supply 26 parts of weight of the propiolophenone compound per million parts by weight of soil. The results obtained in these operations are set forth in the following table.

| Depths below soil surface in inches at which the sections of soil were obtained | Percent control of root-knot nematodes |
| --- | --- |
| 1-3 | 100 |
| 15-18 | 67 |

At the time of the observations, the roots of the check plants were found to be covered with galls attributable to root-knot nematode disease.

The ethynyl ketones as employed in accordance with the teachings of the present invention may be prepared by known methods wherein one molecular proportion of an ethynyl magnesium halide such as ethynyl magnesium bromide is reacted with two molecular proportions of an acid anhydride. The reaction is effected in tetrahydrofuran and at a temperature below −30° C. and preferably at temperatures of −70 or more degrees C. In carrying out the reaction, the acid anhydride is added slowly portionwise to the ethynyl magnesium halide at the contacting temperature range. Upon completion of the reaction, the reaction mixture is washed with aqueous ammonium chloride, the washings extracted with additional reaction solvent, and the solvent extract and washed product combined. The solvent may be thereafter recovered from the latter product by evaporation or fractional distillation under reduced pressure to obtain the desired ethynyl ketone as a liquid or solid residue. In an alternative procedure for preparing the ethynyl ketones one molecular proportion of an ethynyl magnesium halide is condensed with an aldehyde to produce an ethynyl alcohol. Oxidation of the ethynyl alcohol with chromic acid ($CrO_3$) and dilute sulfuric acid gives the desired ethynyl ketone.

This application is a continuation-in-part of my copending application Serial No. 455,094, filed Sept. 9, 1954, and now abandoned.

I claim:

1. In the practice of agricultural economy, the method which comprises impregnating soil with an ethynyl ketone in the amount of at least 2 parts by weight per million parts by weight of soil.

2. In the practice of plant husbandry, the method which comprises impregnating field soil with a competition made up of an ethynyl ketone in admixture with an inert parasiticide adjuvant as a carrier therefor the impregnation being carried out so as to provide at least 2 parts by weight of the ketone compound per million parts by weight of soil.

3. A method claimed in claim 1 wherein the ketone compound is 1-butyn-3-one.

4. A method claimed in claim 1 wherein the ketone compound is 1-pentyn-3-one.

5. A method claimed in claim 1 wherein the ketone compound is 1-hexyn-3-one.

6. A method claimed in claim 1 wherein the ketone compound is propiolophenone.

7. A composition which comprises as an active ingredient an ethynyl ketone in intimate admixture with an adjuvant selected from the group consisting of (A) inert finely divided solids, (B) emulsifying and dispersing agents, and (C) petroleum distillates, the amount of such adjuvants employed in the composition being from 50 to 99 percent by weight for (A), from 1 to 20 percent by weight for (B) and from 15 to 90 percent by weight for (C).

8. A composition which comprises 1-butyn-3-one as an active ingredient in intimate admixture with an adjuvant selected from the group consisting of (A) inert finely divided solids, (B) emulsifying and dispersing agents and (C) petroleum distillates, the amount of such adjuvants employed in the composition being from 50 to 99 percent by weight for (A), from 1 to 20 percent by weight for (B) and from 15 to 90 percent by weight for (C).

References Cited in the file of this patent

UNITED STATES PATENTS

| | | |
|---|---|---|
| 2,543,580 | Kay | Feb. 27, 1951 |
| 2,749,377 | Johnston | June 5, 1956 |
| 2,775,066 | Meuli | Dec. 25, 1956 |
| 2,794,727 | Barrons | June 4, 1957 |
| 2,802,768 | Meuli | Aug. 13, 1957 |